(12) United States Patent
Coyle et al.

(10) Patent No.: US 9,994,450 B2
(45) Date of Patent: Jun. 12, 2018

(54) METHOD AND APPARATUS FOR A LOW COST AND CARBON FREE POINT OF USE DISSOCIATION OF WATER INTO ELEMENTAL GASES AND PRODUCTION OF HYDROGEN RELATED POWER

(75) Inventors: Edward L. Coyle, Lakeville, CT (US); John W. Evans, Sharon, CT (US)

(73) Assignee: EVACO, LLC, Sharon, CT (US)

( * ) Notice: Subject to any disclaimer, the term of this patent is extended or adjusted under 35 U.S.C. 154(b) by 1643 days.

(21) Appl. No.: 12/168,749

(22) Filed: Jul. 7, 2008

(65) Prior Publication Data

US 2009/0038958 A1 Feb. 12, 2009

Related U.S. Application Data

(60) Provisional application No. 60/929,643, filed on Jul. 6, 2007.

(51) Int. Cl.
| | |
|---|---|
| *C25B 9/00* | (2006.01) |
| *C25B 9/02* | (2006.01) |
| *C25B 9/06* | (2006.01) |
| *C25B 15/08* | (2006.01) |
| *C01B 13/02* | (2006.01) |

(Continued)

(52) U.S. Cl.
CPC ........... *C01B 13/0207* (2013.01); *B01J 4/002* (2013.01); *B01J 19/088* (2013.01); *B01J 19/126* (2013.01); *B01J 19/129* (2013.01); *C01B 3/042* (2013.01); *C25B 1/02* (2013.01); *C25B 9/02* (2013.01); *C25B 9/06* (2013.01); *C25B 15/08* (2013.01); *B01J 2219/0826* (2013.01); *B01J 2219/0841* (2013.01); *B01J 2219/0843* (2013.01); *B01J 2219/0871* (2013.01); *B01J 2219/0875* (2013.01); *B01J 2219/0877* (2013.01); *B01J 2219/0894* (2013.01); *Y02E 60/364* (2013.01); *Y02E 60/366* (2013.01); *Y02P 20/128* (2015.11); *Y02P 20/133* (2015.11)

(58) Field of Classification Search
USPC .......................................................... 205/628
See application file for complete search history.

(56) References Cited

U.S. PATENT DOCUMENTS

| | | |
|---|---|---|
| 4,439,662 A | 3/1984 | Tateno |
| 6,063,243 A | 5/2000 | Zettl |

(Continued)

FOREIGN PATENT DOCUMENTS

| | | |
|---|---|---|
| EP | 1 270 508 A1 | 1/2003 |
| JP | S5617902 A | 2/1981 |

(Continued)

OTHER PUBLICATIONS http://www.fusion-eur.org/fusion_cd/magnetic.htm 2003.*

(Continued)

*Primary Examiner* — Brian W Cohen
(74) *Attorney, Agent, or Firm* — McCarter & English, LLP (57) ABSTRACT

Devices are provided for generating a plasma field for dissociating water into elemental hydrogen and water. The elemental hydrogen may be used directly to produce power, or may be stored for use as an energy source or as a commodity. The devices of the present invention can provide on site, point of use sources for producing elemental hydrogen. In addition, the devices can produce a net positive energy output.

12 Claims, 9 Drawing Sheets

(51) Int. Cl.
*C25B 1/02* (2006.01)
*B01J 4/00* (2006.01)
*B01J 19/08* (2006.01)
*B01J 19/12* (2006.01)
*C01B 3/04* (2006.01)

(56) References Cited

U.S. PATENT DOCUMENTS

| | | | |
|---|---|---|---|
| 6,183,604 | B1 | 2/2001 | Santilli |
| 6,744,006 | B2 * | 6/2004 | Johnson et al. ......... 219/121.51 |
| 2002/0100836 | A1 | 8/2002 | Hunt |
| 2003/0059353 | A1 * | 3/2003 | Wootan et al. .......... 422/186.01 |
| 2004/0050686 | A1 * | 3/2004 | Huang et al. ................. 204/173 |
| 2006/0057037 | A1 * | 3/2006 | Anazawa et al. ............. 422/186 |
| 2007/0267289 | A1 * | 11/2007 | Jabs et al. ..................... 204/170 |

FOREIGN PATENT DOCUMENTS

| | | |
|---|---|---|
| JP | 56022602 A | 3/1981 |
| JP | 3088300 A | 4/1991 |
| JP | 2001-043883 A | 2/2001 |
| JP | 2001-159372 A | 6/2001 |
| JP | 2002-220201 A | 8/2002 |
| JP | 05-019353 U | 1/2005 |
| JP | 47-023733 A | 11/2006 |
| JP | 2006-319291 A | 11/2006 |
| JP | 2008109002 A | 5/2008 |
| WO | 2006/123883 | 11/2006 |

OTHER PUBLICATIONS

International Search Report, dated Nov. 18, 2008.

"Synthesis of Aluminum Nitride in Transferred Arc Plasma Furnaces", Ageorges, et al., Plasma Chemistry and Plasma Processing, vol. 13, No. 4, 1993.

European Supplemental Search Report dated May 14, 2012.

* cited by examiner

In consideration:

* 1.00 Gallon of Water = 3.77 Liters (3.77 kg) or 8.3 Lbs

* 18.00 Atomic Mass of $H_2O$
* 1.00 Mol of O atoms = $6.024 * 10^{23}$
* 2.00 Mol of H atoms = $2 * 6.024 * 10^{23}$
* 16.00 Atomic mass of Oxygen
* 2.00 Atomic mass of Hydrogen

* 3770 g / 18 = 209 Mols / gal $H_2O$ 1 pound of Hydrogen gas = 190 Cu Ft.

* Oxygen = 209 Mols O = 3350 grams
209.00 Mols * 22.4 liters/Mol = 4,681.6 liters of O
4681.60 liters * 0.035 Cu Ft = 163 Cu Ft O / gal $H_2O$
163.00 Cu Ft of O /gal $H_2O$

* 1 pound of Hydrogen gas = 61,000 Btu's
* 1 Horsepower = 2544 Btu's
* 0.213 Cost of a Standard Cu Ft of Indus. H
* 1 Gram = 0.001 kg
* 527 Kilojoules/kg = 226.5 Btu's / lb
* 3412 Btu's per Kw Assume 1 gram of liq H = 1.27 Cu Ft of H gas
* 1 Cu Ft = 28.31 Liters
* 1 Mol of gas = 22.4 Liters
* 1 Liter = 0.035 Cu Ft

* Hydrogen = 418 Mols H = 418 grams
418.00 Mols * 22.4 liters = 9363.2 liters of H
9363.20 Liters of H * .035 Cu Ft = 327.72 Cu Ft of H / gal $H_2O$

* 319.00 Btu's per Cu Ft H Gas =
319 Btu / Cu Ft H Gas * 327.72 Cu Ft H / gal $H_2O$ = 104,542.6 H Btu / gal $H_2O$
104542.60 Btu's H / gal $H_2O$ 104542.60 Btu / gal $H_2O$ / 3412 Kw = 30.64 Kw / gal $H_2O$ = 41.00 Horse power / gal $H_2O$

FIG. 3

ASSUME:

Power Consumed
Arc Power Consumption (to be confirmed)
1500.00 Amps
240.00 Volts
360000.00 Watts
360.00 Kw
360 Kw * 3412 Btu / Kw / Hr
1228320.00 Btu's consumed / Hour Water Converted
5.00 lbs per min $H_2O$ feed rate =
300.00 lbs per hour $H_2O$
300.00 lbs $H_2O$ / 8.3 lbs / gal =
36.15 Gallons / hour =
36.15 Gal/H * 104542 Btu/gal =
3779214.99 Btu/h produced These calculations may have errors and warrant scrutiny and confirmation, however, the figures presented here encourage further investigation into the evAco Hydrogen process as it appears to offer a positive gain of Btu's produced over Btu's consumed.

Notes:

- \*     Indicates the parameters for calculation have been verified
- 1     Heat of combustion not included
- 2     Exothermic heat of recombination after combustion not included
- 3     60 - 80% of the electrical energy used by the arc would likely remain with the exit gases as heat energy.

| Sealed Chamber "H" Run | | 02/01/08 | |
| --- | --- | --- | --- |
| Argon Shield gas Cathode | 10 | 10 | SCFH |
| Argon Shield gas Anode | 8 | 8 | SCFH |
| Humidity | 44 | 44 | % |
| Room Temperature | 57 | F | |
| Coolant Pressure | 80 | PSI | |
| Coolant Flow | 1.74 | G/Min | |
| H2O Feed Rate Total | 8.3 | Grams | |
| | 0.2075 | G/Min | |
| "D" Feed Rate Total | 0.0000 | Grams G/Min | |

| | Time Min | VOLTS | AMPS | WATTS | CHAMBER AIR IN FLOW SCFM | AIR IN TEMP | AIR OUT TEMP | COOLANT WATER TEMP IN | COOLANT WATER TEMP OUT | |
| --- | --- | --- | --- | --- | --- | --- | --- | --- | --- | --- |
| 240 | 1 | 47 | 125 | 5875 | 33 | 54 | 54 | 65 | 65 | Arc on |
| | 2 | 46 | 125 | 5750 | 40 | 54 | 110 | 68 | 71 | |
| | 3 | 46 | 125 | 5750 | 44 | 54 | 180 | 71 | 74 | |
| | 4 | 47 | 126 | 5922 | 44 | 54 | 190 | 74 | 79 | |
| | 5 | 46 | 125 | 5750 | 44 | 54 | 210 | 80 | 83 | |
| | 6 | 47 | 125 | 5875 | 44 | 54 | 214 | 81 | 84 | |
| | 7 | 46 | 125 | 5750 | 44 | 54 | 218 | 82 | 85 | |
| | 8 | 46 | 125 | 5750 | 44 | 54 | 220 | 83 | 86 | |
| | 9 | 46 | 126 | 5796 | 44 | 55 | 223 | 83 | 86 | |
| 250 | 10 | 46 | 126 | 5796 | 43 | 55 | 225 | 84 | 88 | |
| | 11 | 46 | 126 | 5796 | 43 | 55 | 225 | 84 | 89 | |
| | 12 | 46 | 125 | 5750 | 43 | 55 | 227 | 85 | 89 | |
| | 13 | 46 | 125 | 5750 | 43 | 55 | 230 | 85 | 90 | |
| | 14 | 46 | 125 | 5750 | 43 | 55 | 231 | 86 | 91 | |
| | 15 | 46 | 126 | 5796 | 43 | 55 | 232 | 86 | 92 | |
| | 16 | 46 | 126 | 5796 | 43 | 55 | 233 | 87 | 94 | |
| | 17 | 46 | 125 | 5750 | 43 | 55 | 234 | 88 | 94 | |
| | 18 | 46 | 125 | 5750 | 44 | 55 | 235 | 89 | 94 | |
| | 19 | 46 | 125 | 5750 | 44 | 55 | 237 | 90 | 94 | |
| 300 | 20 | 46 | 126 | 5796 | 44 | 55 | 239 | 90 | 94 | |
| | 21 | 46 | 125 | 5750 | 44 | 55 | 238 | 90 | 95 | |
| | 22 | 46 | 125 | 5750 | 44 | 55 | 238 | 91 | 95 | |

FIG. 6

| | Time Min | VOLTS | AMPS | WATTS | CHAMBER AIR IN FLOW SCFM | AIR IN TEMP | AIR OUT TEMP | COOLANT WATER TEMP IN | COOLANT WATER TEMP OUT | |
|---|---|---|---|---|---|---|---|---|---|---|
| | 23 | 46 | 125 | 5750 | 44 | 55 | 237 | 91 | 96 | |
| | 24 | 46 | 125 | 5750 | 44 | 55 | 236 | 91 | 96 | |
| | 25 | 45 | 125 | 5625 | 43 | 60 | 236 | 92 | 96 | |
| | 26 | 45 | 125 | 5625 | 43 | 60 | 236 | 92 | 97 | |
| | 27 | 45 | 125 | 5625 | 43 | 61 | 236 | 93 | 97 | |
| | 28 | 44 | 125 | 5500 | 43 | 61 | 236 | 93 | 97 | |
| | 29 | 44 | 125 | 5500 | 44 | 61 | 234 | 93 | 97 | |
| 310 | 30 | 45 | 125 | 5625 | 44 | 62 | 235 | 94 | 98 | |
| | 31 | 45 | 125 | 5625 | 44 | 62 | 235 | 94 | 98 | |
| | 32 | 46 | 125 | 5750 | 44 | 62 | 236 | 94 | 99 | |
| | 33 | 46 | 126 | 5796 | 44 | 62 | 236 | 94 | 99 | |
| | 34 | 46 | 126 | 5796 | 44 | 62 | 236 | 95 | 99 | |
| | 35 | 46 | 126 | 5796 | 44 | 62 | 236 | 95 | 99 | |
| | 36 | 46 | 126 | 5796 | 44 | 63 | 236 | 96 | 99 | |
| | 37 | 46 | 126 | 5796 | 44 | 63 | 236 | 97 | 100 | |
| | 38 | 45 | 126 | 5670 | 44 | 63 | 237 | 97 | 100 | |
| | 39 | 46 | 126 | 5796 | 44 | 63 | 237 | 97 | 100 | |
| 320 | 40 | 46 | 126 | 5796 | 44 | 63 | 237 | 98 | 100 | |
| | 41 | 46 | 125 | 5750 | 44 | 63 | 237 | 98 | 100 | |
| | 42 | 46 | 125 | 5750 | 44 | 64 | 237 | 98 | 100 | |
| | 43 | 46 | 125 | 5750 | 44 | 64 | 237 | 99 | 100 | |
| | 44 | 46 | 125 | 5750 | 44 | 64 | 237 | 99 | 100 | |
| | 45 | 46 | 126 | 5796 | 44 | 64 | 237 | 99 | 101 | |
| | 46 | 46 | 126 | 5796 | 43 | 64 | 237 | 99 | 101 | |
| | 47 | 46 | 126 | 5796 | 43 | 64 | 237 | 99 | 101 | |
| | 48 | 46 | 125 | 5750 | 43 | 64 | 238 | 99 | 101 | |
| | 49 | 46 | 125 | 5750 | 44 | 64 | 239 | 99 | 101 | |
| 330 | 50 | 46 | 125 | 5750 | 44 | 64 | 239 | 99 | 101 | |
| | 51 | 46 | 126 | 5796 | 44 | 64 | 240 | 99 | 102 | H2O on |
| | 52 | 50 | 127 | 6350 | 44 | 64 | 253 | 100 | 102 | |
| | 53 | 50 | 127 | 6350 | 44 | 64 | 255 | 100 | 102 | |
| | 54 | 50 | 125 | 6250 | 44 | 65 | 257 | 100 | 103 | |
| | 55 | 49 | 127 | 6223 | 44 | 65 | 259 | 100 | 103 | |
| | 56 | 49 | 126 | 6174 | 45 | 65 | 259 | 100 | 103 | |
| | 57 | 49 | 127 | 6223 | 45 | 65 | 259 | 100 | 103 | |
| | 58 | 49 | 126 | 6174 | 46 | 65 | 259 | 100 | 103 | |
| | 59 | 49 | 125 | 6125 | 46 | 65 | 260 | 101 | 103 | |
| 340 | 60 | 50 | 126 | 6300 | 46 | 65 | 261 | 101 | 103 | |
| | 61 | 50 | 125 | 6250 | 46 | 65 | 262 | 101 | 103 | |
| | 62 | 49 | 126 | 6174 | 46 | 65 | 263 | 101 | 103 | |
| | 63 | 49 | 125 | 6125 | 46 | 65 | 263 | 101 | 104 | |
| | 64 | 50 | 125 | 6250 | 46 | 65 | 262 | 101 | 104 | Room air |

FIG. 6, cont'd

|  |  |  |  |  |  |  |  |  |  |
|---|---|---|---|---|---|---|---|---|---|
|  | 65 | 50 | 125 | 6250 | 46 | 65 | 260 | 101 | 104 | Exh fan on |
|  | 66 | 49 | 125 | 6125 | 46 | 65 | 255 | 101 | 104 |  |
|  | 67 | 50 | 125 | 6250 | 46 | 65 | 250 | 101 | 104 |  |
|  | 68 | 50 | 125 | 6250 | 46 | 64 | 247 | 101 | 105 |  |
|  | 69 | 49 | 126 | 6174 | 46 | 64 | 245 | 102 | 105 |  |
| 350 | 70 | 49 | 126 | 6174 | 46 | 64 | 245 | 103 | 105 |  |
|  | 71 | 49 | 125 | 6125 | 46 | 64 | 246 | 103 | 105 | Room air |
|  | 72 | 50 | 126 | 6300 | 46 | 64 | 248 | 103 | 105 | Exh fan off |
|  | 73 | 50 | 126 | 6300 | 45 | 64 | 252 | 104 | 105 |  |
|  | 74 | 49 | 126 | 6174 | 45 | 64 | 255 | 104 | 105 |  |
|  | 75 | 50 | 126 | 6300 | 46 | 64 | 257 | 104 | 105 |  |
|  | 76 | 50 | 126 | 6300 | 46 | 64 | 259 | 104 | 105 |  |
|  | 77 | 50 | 126 | 6300 | 45 | 64 | 260 | 104 | 105 |  |
|  | 78 | 49 | 126 | 6174 | 45 | 64 | 259 | 104 | 105 |  |
|  | 79 | 49 | 126 | 6174 | 45 | 63 | 260 | 104 | 105 |  |
| 400 | 80 | 49 | 126 | 6174 | 45 | 63 | 260 | 104 | 105 |  |
|  | 81 | 49 | 126 | 6174 | 45 | 63 | 261 | 104 | 105 |  |
|  | 82 | 49 | 126 | 6174 | 45 | 63 | 262 | 104 | 105 |  |
|  | 83 | 49 | 125 | 6125 | 45 | 64 | 262 | 104 | 105 |  |
|  | 84 | 49 | 125 | 6125 | 45 | 64 | 261 | 104 | 105 |  |
|  | 85 | 49 | 125 | 6125 | 45 | 64 | 260 | 104 | 105 |  |
|  | 86 | 49 | 126 | 6174 | 45 | 64 | 260 | 104 | 105 |  |
|  | 87 | 49 | 126 | 6174 | 45 | 64 | 262 | 104 | 105 |  |
|  | 88 | 49 | 125 | 6125 | 45 | 64 | 262 | 104 | 105 |  |
|  | 89 | 49 | 126 | 6174 | 45 | 64 | 262 | 104 | 105 |  |
|  | 90 | 49 | 126 | 6174 | 45 | 64 | 262 | 104 | 105 |  |
|  | 91 | 46 | 126 | 5796 | 45 | 64 | 261 | 104 | 105 | H2O off arc off |

Very Stable run.
No visible signs of wear on the electrodes.
Consistent and controlled vapor feed using the IV Bag and Nebulizer.
Vapor feed is limited to 0.2 g/min as a function of reducing the
feed flow to a 3/16" ID copper tube.
The Nebulizers put out about twice the volume of vapor
without the restriction.

FIG. 6, cont'd

METHOD AND APPARATUS FOR A LOW COST AND CARBON FREE POINT OF USE DISSOCIATION OF WATER INTO ELEMENTAL GASES AND PRODUCTION OF HYDROGEN RELATED POWER

PRIORITY CLAIM

The present application claims priority to U.S. Provisional Application No. 60/929,643 filed on Jul. 6, 2007, the entire contents of which are hereby incorporated by reference.

FIELD OF THE INVENTION

The present invention is directed, in one aspect, to a device for generating a volumetric plasma field for dissociating water into elemental hydrogen and water. In another aspect, the invention is directed to methods of dissociating water to produce elemental hydrogen and water. In yet another aspect, the invention is directed to production of energy from the hydrogen generated in the plasma field.

BACKGROUND

Over the past decade hydrogen has gained significant momentum as a source of energy. For quite some time, hydrogen has promised to be an excellent source for a future renewable, pollution-free energy source. Oil used to produce energy and for transportation is increasingly costly. The United States, for example, pays hundreds of billions of dollars for imported foreign oil each year.

Hydrogen is colorless, odorless, tasteless, and non-toxic, which makes it different from every other fuel commonly used today. Hydrogen is the preferred fuel to use to power fuel cells, where the only emissions are water and some heat. Similarly, when hydrogen is burned in an internal combustion engine, the only emissions created are water and heat. Additionally, hydrogen is a desirable fuel to use to replace hydrocarbon based fuels in large electrical power generating plants, as well as in most other hydrocarbon based energy systems.

Hydrogen is an element, and it is the most abundant element in the universe. Hydrogen is present in water and is found in that and other forms in all living things. It is also the simplest, lightest element, having only one proton and one electron. Although hydrogen is all around us, it is rarely found in its free-floating or elemental form. It combines with other elements to make common things such as water, sugars, hydrocarbons and carbohydrates.

Approximately 95% of elemental hydrogen is currently produced by the "steam reforming" of natural gas at refineries. Unfortunately, the steam reforming process uses non-renewable fossil fuels and produces pollution containing high carbon emissions. It is therefore desirable, as a long term goal for economic development and production of clean energy, to produce hydrogen from renewable energy sources such as wind or solar power, biomass (plant life), and even from water.

Two of the three most desirable renewable energy sources for production of hydrogen are biomass and water. Neither are very efficient when using presently known processes, which have slow production rates and low volume yield of hydrogen.

Biomass (i.e. plant material) is a renewable energy source and uses an organic process which cleanly produces hydrogen in an environmentally friendly method. Most of the United States has abundant biomass resources, including waste from sugar beet plants, canneries, ethanol and biodiesel producing plants. Long range demonstration projects are showing that the organic biomass methods (the use of enzymes, catalysts, fermentation, and algae) may be used, renewably, in the future to produce hydrogen. Sugar rich wastes produce the most hydrogen, and it is believed that early stage production scale facilities will be able to produce limited volumes of hydrogen within five to ten years.

Water can be used to produce hydrogen utilizing the process of "electrolysis". In electrolysis, hydrogen is produced by passing an electric current through water to cause dissociation of hydrogen and oxygen. However, this process requires substantial amounts of electricity, and when using the most common sources of electricity (i.e. burning of coal, oil or gas) at least some pollution is created. If the electricity is provided by wind or solar energy, the hydrogen is essentially produced without creating pollution. Unfortunately, there is not a great abundance of wind or solar electricity, so the main source of electrical power available to make hydrogen is primarily fossil fuels with carbon based emissions. It is a goal of Government and industry to find a more efficient and lower pollution generating system and method to produce large volumes of hydrogen and hydrogen related power.

Current hydrogen production methods limit any significant use of hydrogen as an energy source due to the high cost and limited capacity for hydrogen production. There is not sufficient hydrogen production capacity or distribution systems to compete with the use of coal, fuel oil, diesel oil, gasoline and natural gas as energy sources. The technology is readily available to convert electric plants, heating units, and industrial facilities to burn hydrogen rather than fossil fuels, but the limited availability of hydrogen severely limits any such development despite the desirability for the environment and reducing the country's energy dependence on oil.

It has also long been recognized that many transportation problems, including significant pollution produced from vehicles, can be reduced or eliminated if an answer is found for improving the efficiency and volumes of hydrogen production with lower cost. It is quite feasible to convert today's internal combustion engines to use hydrogen fuel, as is commonly done for propane and natural gas powered vehicles. However, convenient access to hydrogen is a significant limiting factor. Blending hydrogen with fossil fuels has also been thought to be an early next step because it does not require independent distributions systems. The addition of hydrogen to fossil fuel may increase performance and decrease pollution. However, even that simple step is blocked from going forward due to the limited capacities and high cost, and risks, of producing and distributing hydrogen.

In terms of capacity, the amount of hydrogen currently produced in the United States each year is reported to be only enough to power approximately 1 million hydrogen powered vehicles for about three days. Even if a sufficient volume of hydrogen could be produced, transportation and distribution of hydrogen also can limit its use. Hydrogen, after it is produced, must be compressed as a gas or cooled to a liquid (−253° C.) and stored in heavy cylinders, then transported to the point of use. The compressing, storing, and transporting of hydrogen essentially creates an expense, a safety hazard and a log jam in the distribution system when attempting to move large volumes to the final point of use. With the technologies currently available, and as the use of hydrogen increases, the infrastructure, production and distribution systems will need to be dramatically increased.

Alternatively, new technologies must be discovered to both significantly increase efficient production of hydrogen, and simplify the distribution methods for hydrogen.

Cost is a significant factor limiting the use of any hydrogen process, and especially renewable energy based hydrogen generation. It now costs several times more to make hydrogen from renewable energy sources than by producing hydrogen form fossil fuel. And, it costs several times more (on an energy out basis) to make hydrogen from fossil fuels. It is evident that the cost of making hydrogen can only spiral upward, in the future, (as it is compared to fossil fuels) as industry attempts to improve environmental effects by producing hydrogen from renewable energy sources. It is a primary purpose of the apparatus and methods of the present invention to reduce the cost and the pollution generated when producing hydrogen and hydrogen related power, as compared to both fossil and renewable energy sources.

Accordingly, it would be desirable to have an apparatus and method to produce hydrogen efficiently and economically, and to have the ability to produce hydrogen close to the point of use of the hydrogen. It is would also be desirable to have an apparatus and method to provide a source of hydrogen related power.

SUMMARY OF THE INVENTION

The present invention is directed to an apparatus and method for the production of hydrogen by dissociation of water, and to production of energy from the dissociated hydrogen. The present invention uses a plasma generator capable of producing a high heat and high energy plasma zone. The plasma generator may be used for the on site dissociation of water into elemental gases to provide a ready source of hydrogen. The plasma generator may also be used to produce hydrogen related power. By utilizing a plasma (i.e. fourth state of matter) environment, bound free energy may be liberated from the water molecule. The dissociation of water is known to proceed at high temperature according to the equilibrium:

$$2H_2O \longleftrightarrow 2H_2 + O_2$$

The standard Gibbs Free Energy of formation of water (g) is −228.61 kilojoules/mole, indicating that energy must be input to the system to effect the dissociation. This also indicates that the higher the temperature, the more complete the dissociation, and the less the residual $H_2O$ remaining.

In the apparatus and method of the present invention, the dissociation of water occurs at a very high temperature (typically in excess of 9000° C.), and in an atmosphere that is a fourth state of matter, i.e. a plasma. Because of the unique nature of this high temperature plasma arc wherein the energy level of the molecule may be transformed to a new energy state. The resulting product from the plasma arc comprises a large amount of elemental hydrogen and oxygen resulting from the dissociation of a very large percentage of the water introduced to the plasma arc. The resulting hydrogen and oxygen exist at a modified Free Energy of formation. In addition to the elemental hydrogen and oxygen, any material used to assist the entrainment of the feed to the arc, such as water vapor or inert gases, are also contained in the product stream. Preferably, the materials used to assist the entrainment of the feed to the arc allow the hydrogen to be used as a fuel without further processing.

In a preferred embodiment of the present invention, the method and apparatus uses a hydrogen based fuel (such as water) to produce elemental hydrogen and power in an environment which allows for the reactions of dissociation to occur in milliseconds. Also, in a preferred embodiment, electricity is used to establish a volumetric free standing reactor. Full benefit of the apparatus and method allows for a high throughput of feed relative to electric power consumed in the process. The net yield is a gain in output power (on a BTU basis) due to the release of energy locked within the water molecule.

The apparatus of the present invention generally comprises one or more cathodes, preferably one cathode, and one or more anodes. In one embodiment, the apparatus comprises one cathode and three anodes arranged in a circular pattern equally spaced around the cathode. The anodes are spaced from the cathode at a distance to allow formation of a columnar conduction field between the cathode and the anodes. Means are provided to provide flow of a coolant through the cathode and anode electrodes, and the collars surrounding the cathode and anode(s), during operation of the device.

The cathode electrode is typically a cylindrical body with an upper portion that is generally conical in shape and a conducting tip. The cathode is surrounded by a collar that creates a first gas passageway for the cathode, and a second outer passageway for water vapor.

In operation, an electric current is passed between the cathode and the anode(s) to generate a high heat, high energy magnetically induced containment field to efficiently reduce water to elemental hydrogen and oxygen gas. A gas, preferably an inert gas such as argon, is delivered to the tip of the cathode through the first passageway formed within the cathode collar as a shield gas to the conducting tip, which is preferably a tungsten tip. The gas becomes highly ionized and forms a columnar plasma. Water vapor is fed through the second passageway in the collar and is pushed into the containment field in the area of the plasma that is highest in temperature (typically 20,000° F. to 40,000° F.). The water is dissociated into elemental hydrogen and oxygen.

The resulting hydrogen may be used to produce hydrogen related power for the purpose of energy or as a chemical feed stock. It is also an object of the present invention to reduce the production limiting problems, and the high costs, related to traditional production of hydrogen as discussed above. It is also an object of the present invention to dramatically reduce the use of any fossil fuels burned to create the electrical power required to produce the hydrogen within the apparatus of the present invention. And it is a further object of the apparatus and method of the present invention to create a hydrogen flame (ignited hydrogen gases) which is capable of producing sufficient heat to operate all forms of traditional energy systems such as electrical generation, and furnaces (i.e.; from small units in family homes up to large industrial systems) as well as most other devices which operate on other types of combustible fuels. It is a further object of the invention to achieve all the benefits of generating heat, as detailed above, at an operating cost lower than fossil, or other, carbon based combustible fuels and essentially eliminate all carbon based emissions connected to power generation.

Another object of the apparatus and method of the present invention is to allow the production of hydrogen and generation of hydrogen related power at the point of use, on demand, and to eliminate the need to compress and transport hydrogen by way of a distribution system. If desired, however, the hydrogen produced by the apparatus and method of the present invention may be compressed and stored for transportation, efficiently and in large volumes at a low cost.

The objectives and benefits described above are all achieved by a unique apparatus and method which establishes an extremely high heat energy field of containment into which is formed at least one unique draw point creating an entry into the high energy field of containment. The apparatus of the invention passes metered water vapor acted upon by a volume of air, or an inert gas (i.e.; Argon), directly into the high energy containment field through the unique entry draw point. The water vapor is instantly dissociated (within a few milliseconds) into its elemental gases hydrogen and oxygen. Subsequently the separated elemental gases can be passed out of the high heat energy field where the gases can be burned as a fuel, creating heat for work (or power). Alternatively, the gases may be separated and stored to do future work (or for production of power), or sold as a commodity for various uses.

While not being bound to any particular theory or explanation regarding the mechanism by which the apparatus and method of the present invention may be used to produce energy, the inventors have performed operational and quantitative testing that leads to the belief that the efficiencies gained in the operation of the High Energy Plasma Generator may be the result of a unique, and heretofore undiscovered, simplified process related to the structure and method of operation of the invention. The inventors believe the evidence is strong that the structure of the invention may well be a new, more efficient, and highly simplified apparatus which can produce a unique form of dimensionally reduced (an atom having a smaller electron orbit) hydrogen atoms called "Hydrinos". The existence of Hydrinos, and the related new field of science, has only recently been explored through the development of an alternate and new plasma heated catalyst technology. Until the discovery of the present invention, Hydrinos have only been generated by that alternate technology with its complicated apparatus requiring catalysts in order to cause the Hydrinos to form. In general, the catalytic process of creating a Hydrino is based upon utilizing a potassium catalyst to cause the formation of a dimensionally reduced form of hydrogen from the normal sized hydrogen atom. Hydrogen normally exists in the environment in a "ground state" (which is the atom's state of lowest energy level under normal circumstances). In Quantum Mechanics (QM) that is called the $N=1$ state. Normally the allowed energy states of an atom fit integer values of 1, 2, 3, 4, and so on (that is the significance of the word "Quantum"). Simply understood; the higher the number the higher the state of energy. When a hydrogen atom that has been at a higher state (also called an "excited" state) subsequently falls to a lower state, in which its dimensional size is reduced (the electron's orbit moves toward the center of the atom), then energy is released. This usually occurs as a photon of light, and the observed line spectra emissions of atoms corresponds to these transitions of state.

As is currently known, the ultraviolet line spectra of the sun, which is primarily comprised of hydrogen, are not fully explained by classical Quantum Mechanics. However, the UV spectrum of the sun may be explained using the understandings of the new field of Hydrinos, which proposes that there are fractional quantum states of $\frac{1}{2}$, $\frac{1}{3}$, $\frac{1}{4}$, $\frac{1}{5}$, and so on. These energy transitions fit the UV spectrum of the sun. Because sub-quantum atoms are non-radiative, the new technology and field of Hydrinos, may provide an explanation for "dark matter" that keeps galaxies together by gravity and not flying apart as the high rotational speeds of many of the galaxies. Currently, all processes that are believed to produce Hydrinos utilize complicated catalytic thermal processes that are heated and react externally to the plasmas that drive their reactions. They are typically found to use a basic potassium as the catalyst. However, the operation of these catalytic processes has shown that the energy released in those Hydrino "sub-ground state" transitions is not just theoretical and the results are larger than any known chemical based energy reaction (especially in those of carbon based fuels). The energy released is not as great as nuclear, but is far more than in a chemical reaction released creation of energy. It is a category all unto itself.

In the method and process of the current invention it was discovered, during testing, that the basic energy reaction appears to be the same as the reported reaction in the new field of catalyst derived Hydrinos. However, there is no need for any catalyst to be used within the apparatus and process of the present invention in order to form what appears to be hydrogen atoms in a "sub-ground state", i.e. Hydrinos, and release large amounts of energy. With the discovery of the unique apparatus, method and process to disassociate water into elemental gases of hydrogen and oxygen, the inventors of the present invention have performed numerous tests and now believe to have generated additional confirmation that the formation of Hydrinos is possible and can be replicated within the High Energy Plasma Containment Field created using the apparatus of the present invention. However, unlike the catalytic process, the change of state from normal hydrogen to a sub-ground state is an extremely efficient result of the unique ability of the apparatus to place the water vapor directly inside of the plasma within the High Energy reaction zone.

Figure 3:
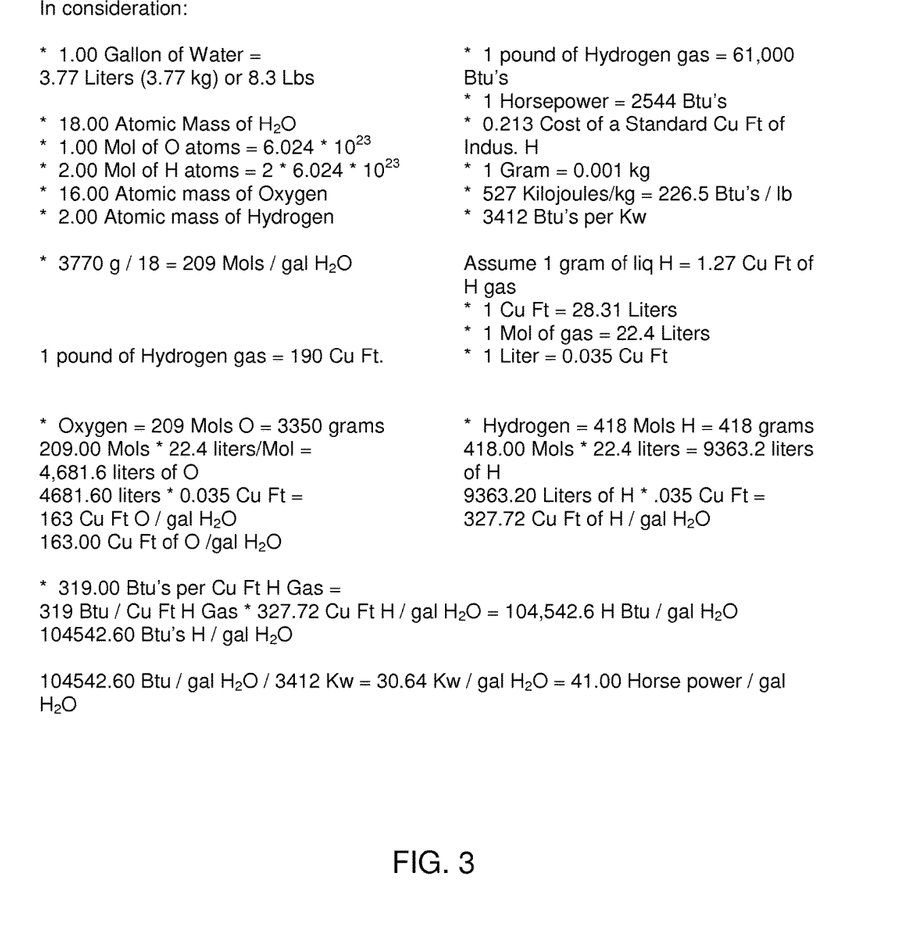
FIG. 3 is a table of calculations detailing the operating efficiency of one embodiment of the apparatus of the invention.

This is further confirmed by the energy positive out put levels observed and recorded, which are fully detailed in the Tables of FIG. 6 below and shown as graphs in FIGS. 4 and 5. Those results came as a surprise during the early testing of the apparatus when it was observed that the energy released was far beyond the model that was mathematically projected as shown in FIG. 3. The inventors believe that there are two levels of energy release during the dissociation of the water into elemental gases, and combustion. There is the typical heat of combustion of the elemental hydrogen gas, and there is the additional energy released as a result of the formation of the "sub-ground state" Hydrinos. The end result is that the entire hydrogen energy release process is extremely energy positive with tests indicating it may be at least +200% (or more), over the energy consumed to sustain the entire operation of the High Energy Plasma Generation Field.

As discussed above, in the operation of the apparatus of the present invention, water vapor enters within the High Energy Plasma Generation Field and is immediately subjected to both the extremely powerful magnetic field surrounding it, and to the trillions of excited free electrons passing through the Generated Containment Field in the plasma. The magnetic field completely contains the water vapor within it, and the trapped vapor is then subjected to the stream of electrons, while also being accelerated to extremely high speeds. It can be envisioned as the water vapor molecules being literally torn apart by what can be thought of as an electron storm, which is essentially a dense tornadic "fog" of trillions of free electrons, which bombard and tear the water molecules apart. As the electrons and the intense magnetic field work upon the water vapor molecules, the hydrogen and the oxygen atoms disassociate and Hydrinos are formed as the electron orbits of the hydrogen atoms are collapsed from a "normal" level to a reduced "fractional" orbit level. As that occurs, and as described above, there is a release of significant energy by the changing of each hydrogen atoms electron's orbit from "normal" to "fractional", and additionally there is energy released from normal combustion of the hydrogen gas. In addition, the hydrino atom is continually attempting to reach equilibrium, in a reaction which may appear to be perpetual motion, but it is not.

In the Energy Plasma Generator Field as energy is released from the hydrogen atoms, and as their normal electron orbits collapse to fractional orbits, the electrons rotate closer to the center of the atom and the atom drops to a lower energy state, as it gives up energy. Then subsequently, in the chain of reactions, the "lost" energy eventually returns to the environment as low level heat after the Plasma Generator exhaust gases react with elements of solar rays which arrive at the Earth's atmosphere. In that reaction, the Plasma Generator vents moist air, laden with residual "sub-ground state" hydrogen (hydrinos), into the environment where photons from the sun are absorbed and return the hydrogen electron orbits from "fractional" to "normal" at which point the hydrogen atom achieves equilibrium. In passing through this process, and gaining the photon from the sun the hydrogen atom is thereby returned from its unnatural lower energy "sub-ground state" to its normal "ground state" and return to a typical minimal energy level. Very interestingly, the energy given up within the plasma's High Energy Generation Field reaction is not lost. The energy is regained, not from the earth, but rather from the sun. The entire process is achieved with only the need to supply water vapor into the Plasma Generation Field, no need for any catalysts, and a minor amount of electricity, as compared to the energy generated. The entire process is energy positive, in major proportions, and environmentally clean.

Accordingly, it is one object of the present invention to provide an apparatus and method using a high heat, high energy field, to efficiently dissociate water to elemental hydrogen and oxygen gases. It is a further object of the present invention to provide a source of hydrogen related power. Other objects and advantages of the present invention will be apparent to those skilled in the art based upon the following detailed description of the invention.

DETAILED DESCRIPTION OF THE INVENTION

The present invention is directed in one aspect to an apparatus and method for efficiently producing elemental hydrogen from a hydrogen containing material, preferably a liquid material, such as by the dissociation of water. The apparatus produces a high temperature, high energy plasma discharge, forming a Containment Field. A source of hydrogen, such as water vapor, is introduced to the plasma column. The water molecules are dissociated into elemental hydrogen and oxygen. The hydrogen may be used to produce power, or it may be collected and stored for use as a fuel, such as a fuel in internal combustion engine.

Figure 1:
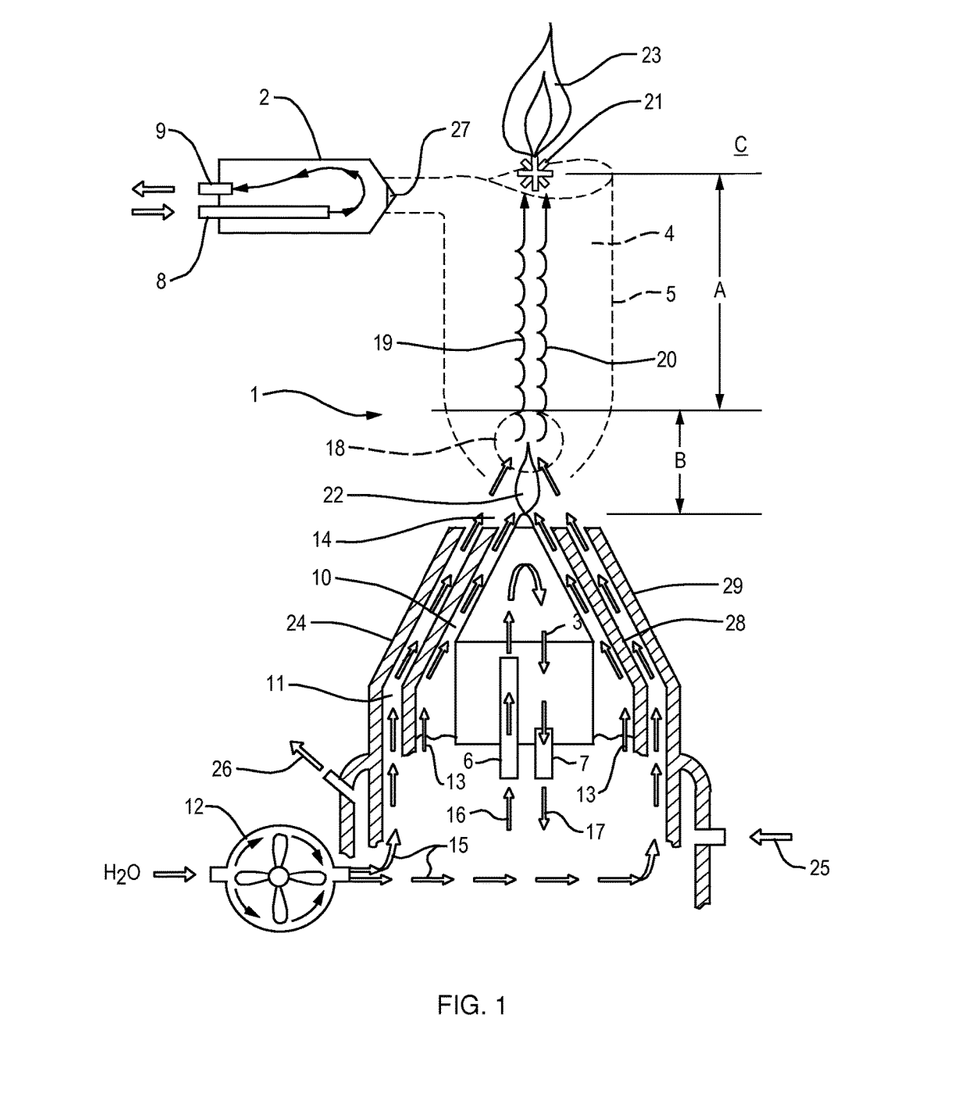
FIG. 1 shows one embodiment of the apparatus of the present invention using a single cathode and a single anode for producing a high heat, high energy plasma generator to dissociate water to produce elemental hydrogen and oxygen.

Referring to FIG. 1, a diagram of one embodiment of a high heat and high energy plasma generator (1) of the present invention is shown. The plasma generator (1) is constructed to operate using electrical power and incorporates one or more anode electrodes (2) and their surrounding collars (not shown), and one or more cathode electrodes (3) and their surrounding collars (24) to which the electric supply is connected. In one preferred embodiment of the invention, the apparatus includes one cathode electrode and three anodes arranged in a circular pattern about the cathode.

As shown in FIG. 1, the anode electrode (2) and cathode electrode (3) preferably include a cylindrical portion and a conical tip region. In a preferred embodiment, the bodies and conical portions of the anode electrode (2) and the cathode electrode (3) are comprised of a non-conductive material, such as a high temperature ceramic material. If a conductive material is used, it should be insulated from any electrical paths. The anode electrode and cathode electrode include tips (14, 27) that conduct electricity. The tips may be made of any material typical for use in electric welding tips or commercial plasma generating equipment. In preferred embodiments, the anode electrode and cathode electrode are comprised of high conductivity tungsten. The cathode tip is connected to the source of electricity by a wire or other connection means through the center of the electrode. It is preferable that the electricity be delivered to the tip without traveling through any screw type connectors.

When energized, an electrical field is generated passing between the tip (14) of the cathode electrode (3) and the tip (27) of the one or more anode electrodes (2). The electricity is provided to the anode and cathode at a voltage and current sufficient to produce the high energy conduction column (the Plasma Generation Field) discussed in detail below. In one embodiment of the invention, electricity is provided at a voltage of about 40 to 60 V and a current of about 100 to 130 amps.

As the electrical arc is established, a strong magnetically induced circular conduction field column is formed, and a high energy containment field (5) is generated. The high energy containment field exhibits both a highly charged electrical field and a variable high magnetic field. The effect of the electric and magnetic fields is rapid movement of electrons, and high heat forms a high energy barrier which acts to contain materials or gases pushed inside the column. Cooling circuits are provided for both the cathode electrode (3) and the anode electrode (2), as well as the cathode collar (24) and the anode collar (not shown). The cathode tip cooling inlet tube (16) and cathode tip cooling outlet tube (17) provide a path for the flow of a coolant through the interior portion of the cathode electrode (3) to cool the tip of the electrode. Similarly, the anode cooling inlet tube (8) and the anode cooling outlet tube (9) provide a path for the flow of coolant through the interior portion of the anode electrode (2). Additionally, the cathode collar (24) is cooled by coolant flowing in through the coolant inlet port (25), and out through the coolant outlet port (26).

Any appropriate fluid may be used to provide cooling to the cathode and the anode. Preferably, a non-aqueous coolant is used as a cooling medium, such as, for example a non-aqueous blend of propylene glycol and ethylene glycol. In a particularly preferred embodiment, the non-aqueous coolant comprises about 70 percent by weight propylene glycol and about 30 percent by weight ethylene glycol, with appropriate additives as necessary. The use of a non-aqueous coolant establishes a unique benefit to the operation of the apparatus of the invention. The higher boiling point water free coolant (390° F.) allows for increased heat transfer at the high heat fluxes which occur at the point of current "terminus" on the electrode, and avoids any hot spots being generated within the cathode and anode collars, which eliminates any "flashing" of the water vapor within the feed channel (11) of the cathode collar. Therefore any chance of reversion of the water vapor feed is totally eliminated. This unique feature allows for the ability of the present invention to place low pressure cool water within the Plasma Generation field of the present invention, as opposed to the need to use high pressure steam.

The cathode electrode is surrounded by a cathode collar (24) which is preferably constructed as a single unit, but may be made up of multiple pieces if desired. The cathode collar includes a first wall (28) and a second wall (29). The first wall (28) of the cathode collar has parallel lines to those of the cathode electrode to create a first flow path (13). The cathode collar (24) also contains additional channels between the first wall (28) and the second wall (29) to form a second flow path (11). A water supply is connected to a water vaporizer (12) which injects water vapor through line (15) to the second flow path (11) contained in the collar body surrounding cathode electrode (3). The second flow path (11) directs the water vapor directly into the plasma reaction zone (5). The first flow path (13) is connected to an inert gas supply, preferably an argon supply. The first flow path (13) carries and delivers the inert gas to shield the tip area (14) of the cathode (3) from ambient air and oxygen. The anode electrodes are surrounded by an anode collar (not shown) which has a similar design to the cathode collar.

In operation, when electrical power is supplied to the high energy plasma generator (1) a highly energized electric discharge is created which passes between the cathode electrode (3) and the one or more anode electrodes (2). The magnetic field of the electrical arc creates a high energy containment field (5) which contracts inward and around to form an approximately conically shaped section at area (B).

At approximately the same time as the electrical arc is ignited, an inert gas, preferably argon, is delivered to the cathode tip area (14) by way of first flow path (13). In one embodiment of the invention, the argon is delivered at a flow rate of about 8 to 10 standard cubic feet per second Similarly, the anode electrode tip area is also fed shield argon gas through internal channels within the anode collar (not shown). The inert gas fed through the cathode collar is drawn into the contracted containment field area (B) and enters around the area which will become the plasma's hottest point; the plasma "bubble" (22). At that point, the inert gas becomes highly ionized forming a plasma. The plasma passes upward through the containment field at extremely high speed. In the same manner, water vapor, generated within the water vapor generator (12), is passed through the second flow path (11) to the cathode tip area (14) and is drawn or pushed into the containment field (5) at the contraction area (B). The amount of water fed to the containment field depends upon the size of the unit. In the embodiment used for the tests described in below and shown in FIGS. 4-6, the water vapor feed rate was about 0.2075 grams/minute.

The water vapor is immediately exposed to the highest heat of the containment field, between 20,000° F. to 40,000° F. around the plasma bubble (22) at the base of the column.

The water vapor molecules are dissociated within milliseconds into the elemental gases, hydrogen (19) and oxygen (20). The gases, which remain dissociated due to the extreme heat in and around the reaction generation area (18), then pass through the energy containment field (5) at a high rate of speed. Gases are kept within the field by the magnetic containment wall surrounding the field (5). As the gases (19) and (20) pass through the containment field they continually drop in temperature after they pass out of the end of the field (5) at the end adjacent to the ambient area (C).

It is at this point that a critical, and unique, event occurs that is the end result of the method and apparatus of the present invention. As the two gases (19) and (20) pass through into the cooler ambient conditions of (C), dropping rapidly in temperature, they cool to a temperature level whereby the temperature level is still sufficiently high enough that the gas mixture will not reform into water (typically above 3000° F.), however it is at a critical temperature level whereby ignition will occur (21) (typically below 7000° F.) and high levels of energy (23) are released to do work. Testing and studies by others suggests that the hydrogen and oxygen gases remain elemental at temperatures between 3000° F. and 10,000° F. and that the gases can be separated, drawn off and stored prior to combustion.

Figure 2:
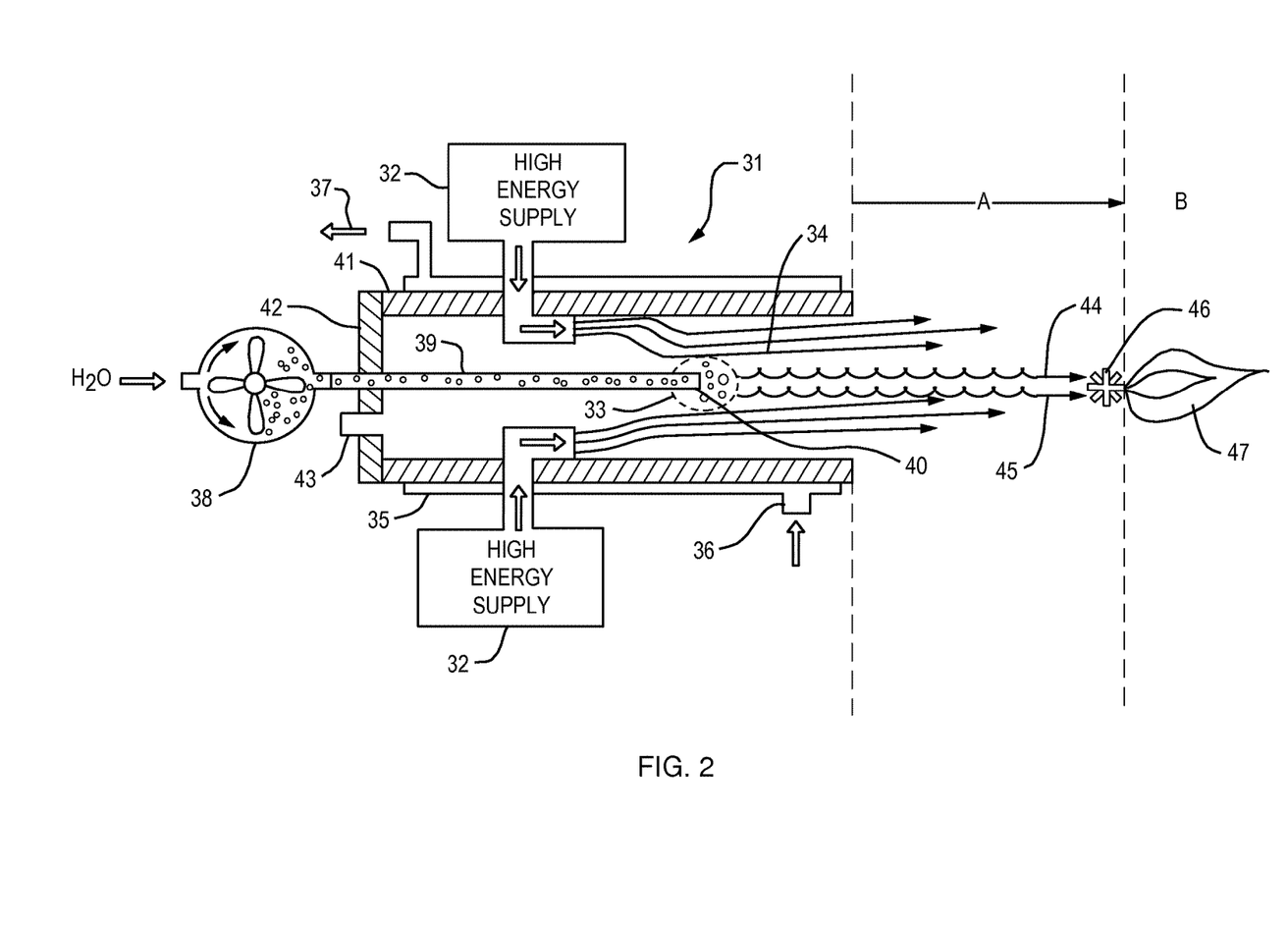
FIG. 2 shows a second embodiment of the apparatus of the present invention for producing a high heat, high energy plasma generator to dissociate water to produce elemental hydrogen and oxygen.

Referring now to FIG. 2, an embodiment of a system which is structured to operate using the unique technology of the current invention is shown. The system shown in FIG. 2 is one of many possible constructions of a high heat, high energy hydrogen, and hydrogen related power, generating containment unit (31) of the present invention. The wall (41) of the containment unit (31) is made up of solid material, typically of metal. Preferably, the containment unit is nonconductive. The containment unit may be made of a nonconductive or insulated copper, brass, aluminum, or ceramic. The containment unit (31) is a hollow cylinder, capped on one end, which is constructed to operate with any one of several well suited high energy source supply units (32) such as a high energy laser, a high frequency radio wave transmitter, a microwave generator, or a high energy electro magnet, etc. This configuration shows two high energy supply units, however it could alternately be constructed with just one high energy supply unit, or an arrangement of any number of multiple high energy source units. There are numerous power sources available to use for the high energy supply units. The energy source must be capable of generating a maximum heat level of about 20,000° F. to 40,000° F. at the hydrogen generation reaction area (33) through the process forming a vessel of highly excited electrons and protons.

The hydrogen generation reaction area (33) is created by a high heat and high energy field (34) established within the containment unit (31) within the cylindrical wall (41) and through the high energy containment unit (31). The containment unit is surrounded by a cooling jacket (35) typically with a low inlet (36), and a higher outlet (37). Various cooling media may be employed for cooling. Due to the high heat generated within the containment unit (31), the cooling media is preferably a non-aqueous coolant, with appropriate additives.

For the introduction of a water based feed stock to be converted into hydrogen and oxygen, an outside water source supplies liquid water to a water vaporizer (38). The water vaporizer delivers water vapor, preferably at ambient temperature, through a water vapor delivery tube (39) that extends directly into the hydrogen generation reaction area (33). Alternatively, heated water or steam may be fed to the reaction area. At the end of the water vapor delivery tube is a vapor outlet nozzle (40) that discharges the water vapor directly into the hydrogen generation area (33). The cylindrical wall (41) of the containment unit (31) may be sealed by a cap (42) on the water vapor tube (39) end of the containment unit (31). The end cap (42) may also be fitted with one or more orifices (43) for the modulated induction of ambient air into the containment unit (31). Additionally, modulated orifices, similar to the end plate orifices (43), may also be fitted with conduits through which modulated inert gas (i.e.; argon) can be introduced into the containment unit (31).

In operation, the high energy supply unit(s) (32) generate an energy field that passes through the wall (41) into the containment unit (31). The high energy fields create a temperature environment in a range of about 20,000° F. to 40,000° F. within a critical area of the containment unit (31). The high energy, high temperature fields (34) flow through the interior of the containment unit (31) toward the open end area at (A). The energy fields (4) accumulate toward the centerline of the containment unit (31) and at the closest point the highest temperature (between the about 20,000° F. to 40,000° F. discussed above) is reached which forms the hydrogen reaction generation area (33). In order to protect the containment unit (31) from damage, cooling jackets (35) are placed against the wall (41) through which coolant (preferably non-aqueous formulations) pass in, and out, through coolant ports (36) and (37). Supply water is connected to the inlet of a water vaporizer (38) which converts the water to a vapor and passes the vapor through the water vapor tube (39) and releases from the water vapor outlet port (40) directly into the extremely high heat of the hydrogen generation area (33). The water vapor (water molecules) is instantly reduced, and separated, to its elemental gases; hydrogen (44), and oxygen (45). The gases, which remain separated, due to the extreme heat within the energy field (34), pass through the containment unit (31) dropping in temperature, and then pass out the end into the ambient area (A) where they rapidly continue to drop further in temperature due to exposure to the ambient conditions.

It is at this point that a critical, and unique, event occurs that is the end result of the method, and apparatus, of the present invention. As the two gases (44) and (45) pass through the cooler ambient conditions of (A), dropping in temperature, they reach a temperature level whereby the temperature level is still too high and the two gases will not reform into water (as described above in relation to FIG. 1), however it is a critical temperature level whereby ignition will occur (A-1). At that point combustion occurs (46) and high levels of energy are released to do work (47).

FIG. 3, is a table of mathematical calculations, based upon the operation of a bench test constructed by the inventors of the present invention, which quantify the potential energy gain (net power gained), on a BTU basis. The results of the calculations indicate that when operating the plasma arc at an assumed energy in level of 5 Kwh, while processing of $H_2O$, the net result would be a gain in energy. Specifically the results show that, on a Btu basis, the energy consumed would be 1,228,320 Btu's, and the power produced in the form of hydrogen would be 3,779,214 Btu's. The actual net gain had not yet been completely quantified at the time of this calculation, but is discussed further below and in FIGS. 4, 5 and 6. However, the results of this initial study and calculation were strongly positive. Even doubling the energy consumed or halving the energy produced, as indicated in the calculations, would still net an extremely positive result.

SUMMARY OF TESTS OF ONE EMBODIMENT OF APPARATUS

The work was done on apparatus constructed according to the present invention, and the equipment produced is referred to herein as an Ionized Gas Reactor ("IGR"). During the tests using the IGR, there were new discoveries about the gains in energy potential and a further explanation of the source of the energy generated within the IGR (on a BTU/Hr basis). Additionally, a template for the test parameters, variables, and results was constructed in a spreadsheet to assist in the interpretation of the experimentally obtained data. In the end, a precise Energy Balance format was constructed to quantify all the IGR test results. Subsequently, test runs were performed to establish the following:

(a) Calibrate the sources of energy input and energy output to enable an energy balance;

(b) Determine the exact energy generation, within the IGR, with water injected within the energy generation field; and (c) Determine if water enriched with heavy water (Deuterium) would show an increase in energy generation to rule in, or rule out, any inter-reaction of Hydrogen and Deuterium.

In order to calibrate the sources of input and output energy, a Heat Balance Template was developed, which accounts for:

(i) Electrical energy input to the IGR (sustaining the reactor field);

(ii) Heat out from electrodes through the non-aqueous cooling circuits;

(iii) Heated air out in air stream exhausted from the IGR system enclosure;

(iv) Heat out through convection heat from the enclosure walls, to the ambient room;

(v) Latent heat of evaporation of water injection;

(vi) Humidity of air into system and the variation of specific heat; and (vii) Energy of heat into the IGR system enclosure from ambient room air;

The tests were performed using an apparatus of the type shown in FIG. 1. Some of the dimensions of the apparatus used in the testing were as follows. The cathode body assembly comprising the cathode electrode (3) and the cathode collar (24) had a 3 inch diameter in the cylindrical body portion of the cathode assembly and a 60 degree taper in the conical portion of the upper part of the cathode assembly. The upper conical portion had a length of 1.5 inches. The diameter of cathode body assembly face at the tip end (14) was 1.25 inches. The cathode electrode and the anode electrode each had diameters of 0.5 inches. The first flow path (13) is about 0.018 inches in width and the second flow path (11) is about 0.14 inches in width. The cathode electrode tip extended about 0.0625 inches past the cathode body assembly face at the tip end (14). The distance between the cathode electrode and the anode electrode during start-up was about 0.5 inches and was increased to about 1.0 inch after the device was running. The apparatus was run at about 5 kW of power. It will be understood that larger devices can be constructed for use at higher powers using the teachings and examples provided herein.

Figure 4:
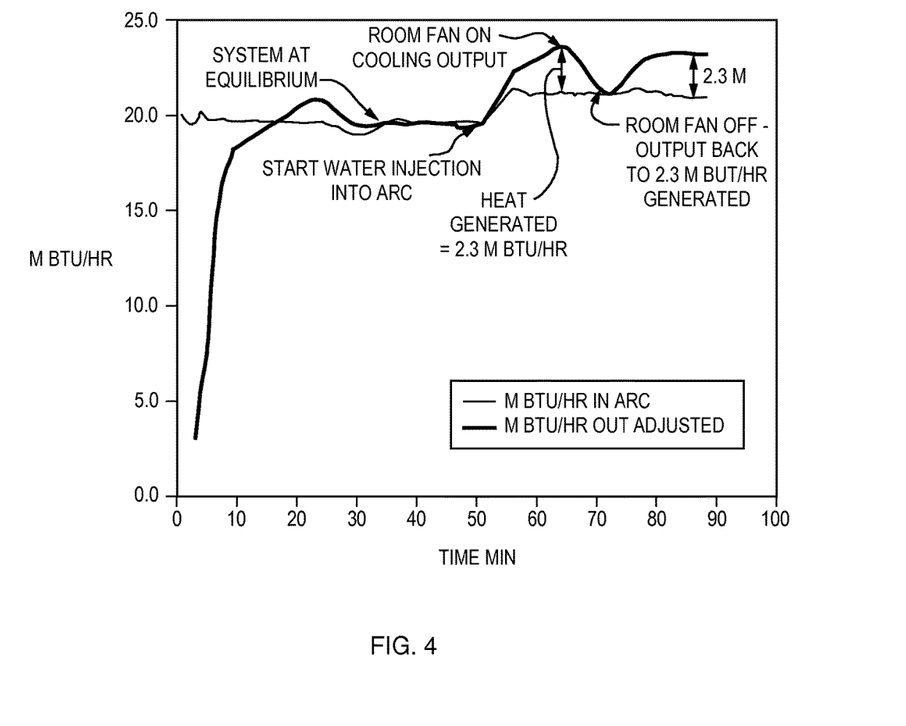
FIG. 4 is a chart showing the heat flow vs. time in the plasma arc and output from one embodiment of the apparatus.
Figure 5:
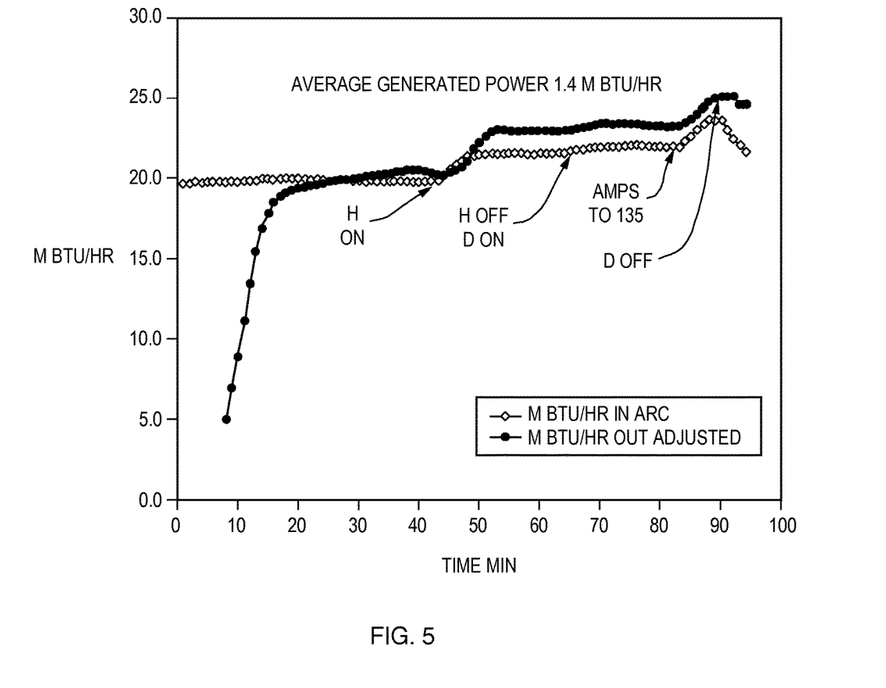
FIG. 5 is a chart showing the heat flow vs. time in the plasma arc and output from one embodiment of the apparatus.
Figure 6:
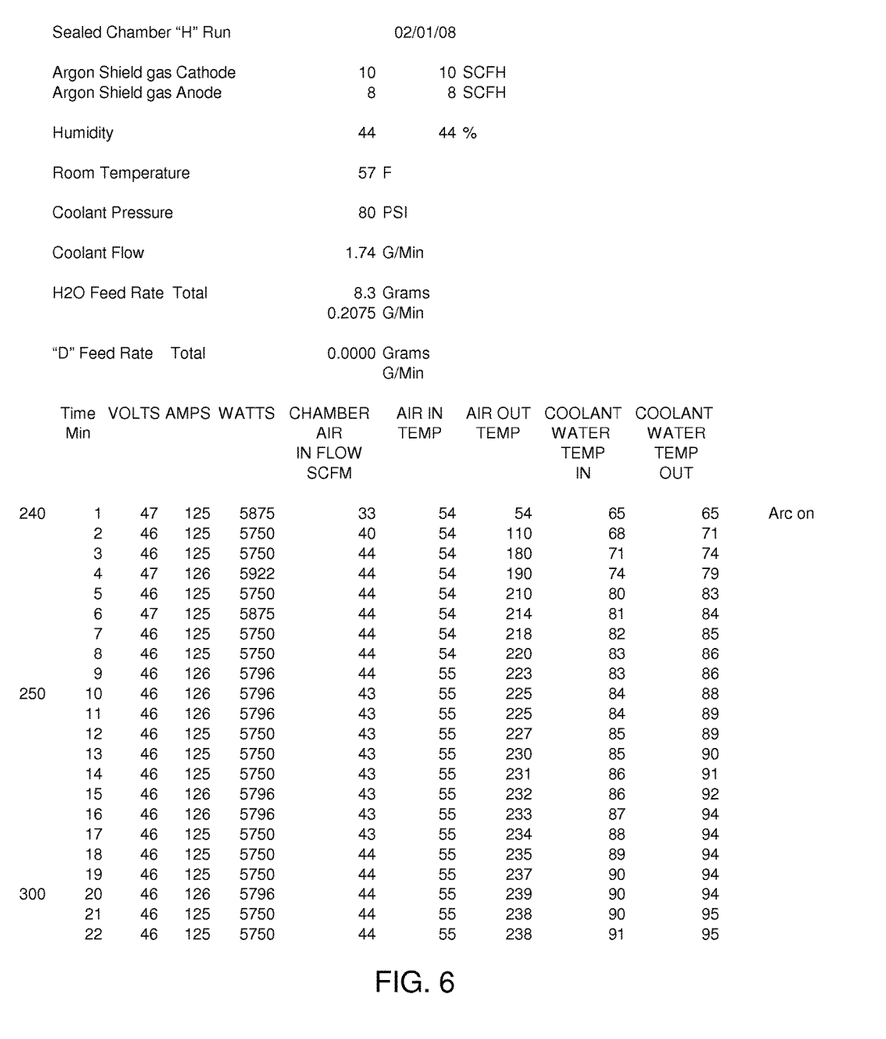
FIG. 6 is a table summarizing the operating parameters and results for the operation of one embodiment of the apparatus.

FIG. 6 shows the operating parameters and results obtained during the tests performed to obtain the results shown in FIGS. 4 and 5. The IGR system was constructed to provide a continuous feed of water to the IGR. To begin, this system was run with argon gas injected within the generation field and, after equilibrium had been attained, water vapor was introduced into the IGR. The results are shown in FIG. 4 as a graph produced from the Heat Balance template.

The system reached stabilized equilibrium (the point at which neither the heat input, nor the heat output rose in temperature during a given period of time) after approximately 30 minutes. At that point water vapor was then introduced within the plasma of the IGR. The input power was then increased very slightly (due to operational property changes in the reactor). Then, at that time, the power output (in BTU's/Hr) substantially changed to the positive, so that a net increase of 2.3 M BTU/Hr, over all energy required to sustain the reaction, was generated by the IGR.

Subsequently, and as a confirming test, the ambient room temperature was decreased by activating the room ventilation system. The excess room air cooled the inlet air to the enclosure, and dropped the enclosure's internal air, and the exhausted air, altering the stabilized thermal equilibrium. After quantifying, and recording, exactly how much the inlet, and exhaust, temperatures of the reactor had decreased, the room ventilation system was turned off. Stabilized equilibrium in the reactor was restored, and the net BTU/Hr power gain of 2.3 M BTU/Hr returned. The observed results of this confirmation test are shown in FIG. 4, which illustrates this event.

An additional run was made where ordinary water was first injected into the IGR. It was then replaced by an injection of "heavy water" enriched water (Deuterium) at a ratio of 1:50 Deuterium/Water. The results of this run are shown in FIG. 5. After stabilized equilibrium had been reached (in 42 minutes), water was introduced, and there was a net generation gain of energy in the IGR, which then once again reached stabilized equilibrium after about 35 minutes. At that point the heavy water enriched ordinary water (at a ratio of; 1:50 Deuterium to Water) was then injected into the reactor with no substantial additional gain in the energy generated observed.

Near the end of the run, the amperage to the IGR was manually increased. The results show that there was an increase in input and output to the system, but there was no difference in the net generation of power within the IGR.

In conclusion, the results reached during this group of Quantifying Tests clearly supports the unique discovery that using the apparatus of present invention and the process, for the dissociation of water into hydrogen and oxygen, produces energy positive gains (on a BTU/Hr basis), over the energy required (consumed) to sustain the IGR reaction. And, surprisingly the observed energy gained was in excess of the energy gain mathematically predicted (as calculated) in FIG. 3.

While preferred embodiments have been shown and described, various modifications may be made to the processes and methods described above without departing from the spirit and scope of the invention as described in the appended claims. Accordingly, it is to be understood that the present invention has been described by way of example and not by limitation.

We claim:

1. A device for producing hydrogen and oxygen comprising:
   (a) a cathode assembly comprising a cathode electrode having a cathode tip and an electrode collar surrounding the cathode electrode forming a first flow passage and a second flow passage, the electrode collar having a first wall defining a first flow passage between the first wall and the cathode electrode configured to supply an inert gas at the cathode tip to form a high energy plasma field, and the second flow passage having a second wall and being formed between the first wall and second wall and configured to supply water and/or water vapor inside the high energy plasma field adjacent to the cathode tip, wherein the cathode tip extends beyond the end of the first and second walls; and
   (b) at least one anode assembly comprising an anode electrode.

2. The device of claim 1, wherein the cathode electrode comprises a cylindrical body portion and a conical nose portion having a conductive tip.

3. The device of claim 2, wherein the cylindrical body portion and the conical nose portion are comprised of one of a high temperature ceramic or an insulated metal.

4. The device of claim 1, further comprising means for internally cooling the cathode electrode and the anode electrode using a liquid coolant.

5. The device of claim 4, wherein the coolant is a non-aqueous coolant.

6. The device of claim 1, further comprising a water vapor generator.

7. The device of claim 1 wherein a plurality of anode electrodes are arranged equidistantly from the cathode assembly.

8. The device of claim 1 wherein the electrode collars are comprised of one of copper, brass or a ceramic material.

9. The device of claim 1, wherein the distance between the cathode electrode tip and the anode electrode tip is about 0.5 inches at the time that power is supplied to the device, and the distance between the cathode electrode tip and the anode electrode tip is increased to about 1.0 inch after the electric arc is formed.

10. The device of claim 1, wherein the anode has an electrode collar surrounding the anode electrode and forming at least one flow passage.

11. The device of claim 3, wherein the conductive tip is comprised of tungsten.

12. The device of claim 1, wherein an electric arc defining a magnetic containment wall extends between the cathode assembly and the at least one anode assembly and forms a contraction zone adjacent to the cathode tip inside which the water and/or water vapor is pushed and wherein the high energy plasma field is contained within the magnetic containment wall.

* * * * *